Feb. 23, 1965   H. J. STOCK   3,170,312
PATTERN WHEEL ARRANGEMENT
Filed Jan. 22, 1963   3 Sheets-Sheet 1

INVENTOR:
HANS JOACHIM STOCK

Michael S. Striker,
Attorney

Feb. 23, 1965  H. J. STOCK  3,170,312
PATTERN WHEEL ARRANGEMENT
Filed Jan. 22, 1963  3 Sheets-Sheet 3

INVENTOR:
HANS JOACHIM STOCK

Michael S. Striker,
Attorney

United States Patent Office 3,170,312
Patented Feb. 23, 1965

3,170,312
PATTERN WHEEL ARRANGEMENT
Hans Joachim Stock, Freiburg, Germany, assignor to
Franz Morat, G.m.b.H., Stuttgart-Vaihingen, Germany
Filed Jan. 22, 1963, Ser. No. 253,114
20 Claims. (Cl. 66—50)

The present invention relates to a pattern wheel arrangement, and more particularly to a pattern wheel which is electrically controlled so that a desired pattern can be established by shifting selected jacks to an operative position.

In the copending application Schaeder Serial No. 77,389, now Patent No. 3,079,775 for a "Pattern Control Arrangement" springs or levers are selectively operated by electromagnetic selector means to shift selected jacks to an advanced operative position in which they can act on the cylinder needles of a circular knitting machine on which the pattern wheels are provided.

The springy elements must be held in tensioned position by the selector magnet which must operate at very high speed when energized, and has consequently a low magnetic force. On the other hand, the resilience of the springy members must be sufficient to move the respective jacks to the operative position. It is difficult to manufacture springy members of exactly uniform resilience, and consequently errors in the selection may occur. Furthermore, since the springy members directly act on the jacks, they extend in substantially axial direction of the pattern wheel, so that the length of the springy members is limited by the height of the pattern wheel.

It is one object of the invention to overcome the disadvantages of known arrangements for setting the jacks of a pattern wheel in a selected pattern, and to provide a pattern wheel of simple construction which will reliably operate for a very long period of time. Another object of the invention is to provide a pattern wheel with control springs of such length that even an extremely great number of very frequent bending operations will not cause fatigue of the control springs.

Another object of the present invention is to shift the jacks between inoperative and operative position by rigid elements.

Another object of the present invention is to shift selected jacks to the operative position by rigid coupling members which have no joint, and which are not resilient.

With these objects in view, a pattern wheel arrangement according to one embodiment of the invention comprises a rotary carrier, a plurality of needle-influencing elements, such as jacks, mounted on the carrier means for rotation therewith and being movable between inoperative and operative positions, a plurality of coupling members mounted on the carrier means for movement between an inoperative position and a coupling position coupled with a corresponding jack, control means for moving selected coupling members to and from the coupling position so that only selected jacks are coupled with the coupling members; and other control means for moving the coupling members between inner and outer positions so that selected jacks which are coupled with coupling members, are shifted to an operative position in which they are adapted to influence the cylinder needles of a circular knitting machine.

The control means by which coupling members are selected in accordance with a desired pattern, include electromagnetic selector means, and control cams. In the preferred embodiment of the invention control members are provided in the form of radially extending springs which are controlled by the above-mentioned cams, and by the electromagnetic selector means to shift associated coupling members to and from the coupling position coupled with the corresponding jacks.

In the preferred embodiment of the invention, the coupling members are thin coupling plates having a cam follower projection cooperating with cam means, and a coupling projection adapted to pass into coupling slots of the corresponding jack. The jacks have a coupling projection which is engaged by the coupling projection of the corresponding coupling member if it is desired to couple coupling member and the jack only for movement in inward direction from the operative to the inoperative position.

Each coupling member is moved in radial direction for shifting the corresponding jack between the inner inoperative position and the outer operative position, and preferably each coupling plate has a curve or slanted bottom edge which permits a tilting movement of the coupling plate between a higher inoperative position and a lower coupling position coupled with the corresponding jack.

In the preferred embodiment of the invention, radially extending elongated control springs are controlled by cams to move the coupling members to and from the coupling position, and other cams hold the coupling members in the coupling position while the jacks pass through the operating station. However, it is also possible to operate rigid control levers by control cams.

In the preferred embodiment of the invention, the control springs are guided by a cam surface into the proximity of the selector magnet, so that the force of the magnet need only be great enough to hold the control spring in the desired position, while the tensioning of the control spring is accomplished by the cam. Those control springs which are not held by the selector magnet return resiliently to a normal position, and an auxiliary magnet prevents vibrations of the control springs which are not held by the selector magnet. Control springs in normal position are engaged by another cam track to effect movement of the associated coupling members to a coupling position.

Due to the fact that the control springs extend in radial direction into the vicinity of the periphery of the pattern wheel, the free ends of the control springs, which are operated by the selector magnet are spaced a considerable distance which is far greater than the distance between the springy operating elements of the prior art, and consequently facilitates the operation.

Following the selector magnet in the direction of rotation of the control springs, a permanent magnet is provided for guiding the control springs to a cam which determines the position of the control springs, and consequently the positions of the associated jacks.

The novel features which are considered as characteristic for the invention are set forth in particular in the appended claims. The invention itself, however, both as to its construction and its method of operation, together with additional objects and advantages thereof, will be best understood from the following description of specific embodiments when read in connection with the accompanying drawings, in which:

FIG. 7a is a front view, FIG. 7b is a side view, and

FIG. 7c is a rear view of a coupling plate forming part of the embodiment of FIG. 1;

FIG. 8a is a front view, FIG. 8b is a side view.

Figure 9A:
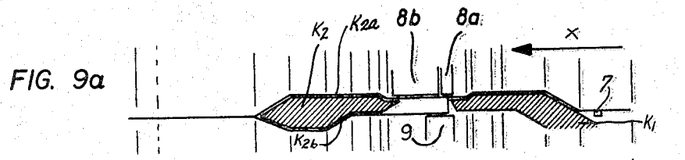
FIG. 9a is a developed sectional view taken along line IXa—IXa in FIG. 1.
Figure 10:
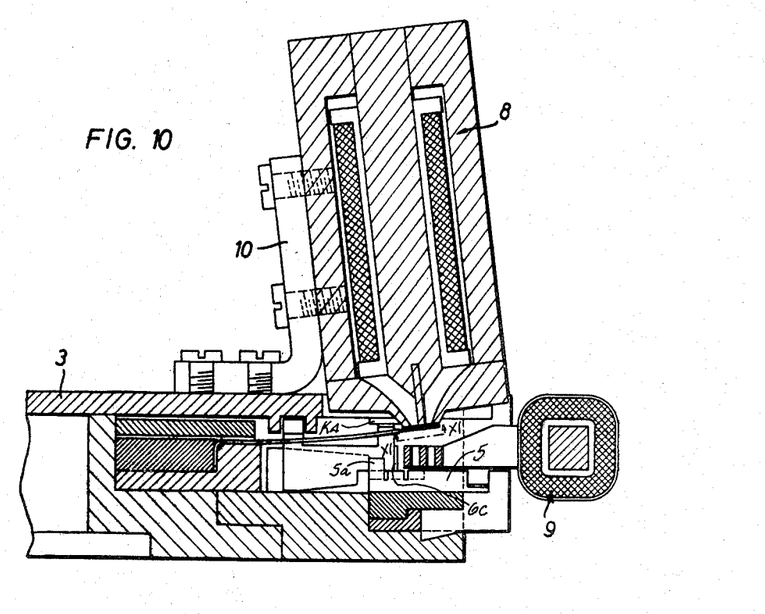
FIG. 10 is a fragmentary axial sectional view showing the embodiment of FIG. 1 in another operational position, and with electromagnetic selector means which are omitted in FIG. 1 for the sake of simplicity.
Figure 11:
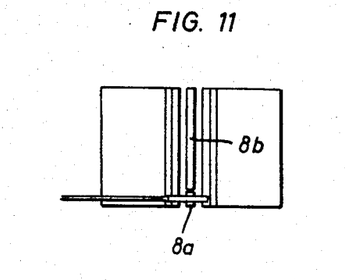
FIG. 11 is a fragmentary bottom view taken on line XI—XI in FIG. 10.

Referring now to the drawings, the pattern wheel has a carrier means 1 which is mounted for rotation on a stationary journal 2 to which a stationary support in the form of a cover plate 3 and a cylindrical wall 3a is secured. The stationary cover plate 3 has a pair of parallel endless cams $K_3$ whose shape is best seen in the developed view of FIG. 9c, and another endless cam $K_4$ whose shape is best seen in the developed view of FIG. 9b. Cover plate 3 and wall 3a support a pair of cams $K_1$ and $K_2$ whose shape and circumferential location is best seen in the developed view of FIG. 9a. An electromagnetic selector means 8 is secured by bracket 10 to cover plate 3, as best seen in FIG. 10, and has two poles 8a and 8b, best seen in FIG. 11, which are located in the region of a gap between cams $K_1$ and $K_2$, as best seen in FIG. 9a.

Figure 12:
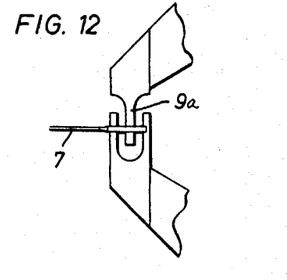
FIG. 12 is a fragmentary plan view taken on line XI—XI.

An auxiliary electromagnetic cams 9 is secured to wall 3a by a bracket, not shown, and has a pair of poles 9a, best seen in FIG. 12, which are also located in the region of the cap between cams $K_1$ and $K_2$, and are located at the end of cam $K_1$ extending opposite pole 8a and a part of pole 8b.

Carrier means 1 is assembled of a number of parts. The inner bearing part 1a rotates on journal 2, a circular part 1b is secured to part 1a and slides with the same on a supporting plate 2a which is secured to the journal 2. A first ring 1c is secured to part 1b and has a series of radially extending milled channels in which a series of plate-shaped teeth 4 are secured by means of another ring 1d. A pattern wheel is mounted at each station of a circular knitting machine spaced about the circumference of the knitting cylinder, and the teeth 4 will extend between the needles of the needle cylinder, so that the carrier means 1 of the pattern wheel is rotated on journal 2.

Figure 5:
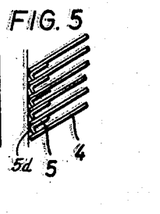
FIG. 5 is a fragmentary sectional view taken on line V—V in FIG. 1.
Figures 7C, 8A, 8B:
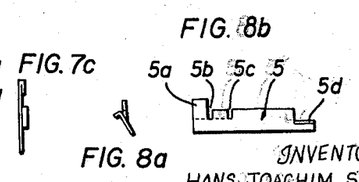
Figure 8C:
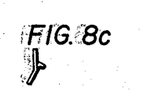
FIG. 8c is a rear view of a jack forming part of the embodiment of FIG. 1.

Between adjacent teeth 4, a series of needle-influencing jack elements 5 is mounted, as best seen in FIG. 5. Plate-shaped teeth 4, and the also plate-shaped jacks 5 are inclined to radial planes, as clearly shown in FIG. 5. The exact shape of a needle-influencing jack element 5 is best seen in FIGS. 8a to 8c which shows a higher portion 5a at the rear end of the jack, a slot 5b adjacent the front edge of the projection 5a, a slot 5c spaced in radial direction from slot 5b, and a transverse lug or projection 5d at the forward end of jack 5. As shown in FIG. 5, projection 5b is guided between two plate-shaped teeth 4.

Figure 1:
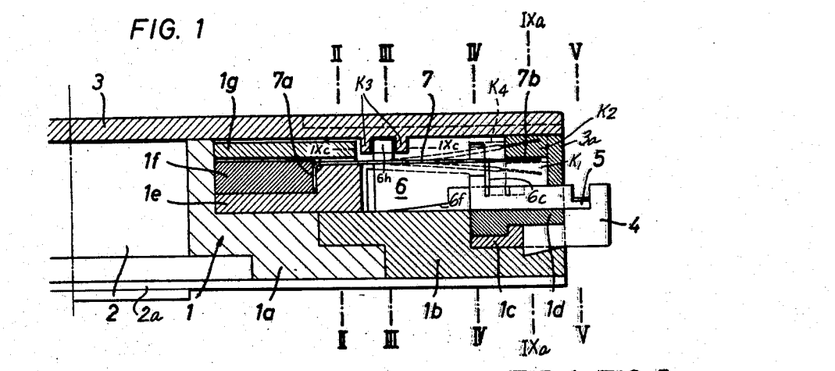
FIG. 1 is a fragmentary axial sectional view illustrating an embodiment of the invention.
Figure 2:
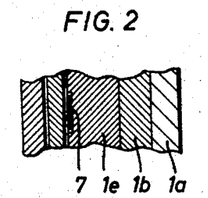
FIG. 2 is a fragmentary sectional view taken along the line II—II in FIG. 1.
Figure 3:
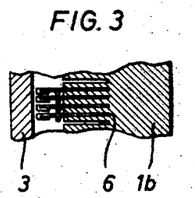
FIG. 3 is a fragmentary sectional view taken on line III—III in FIG. 1.
Figure 4:
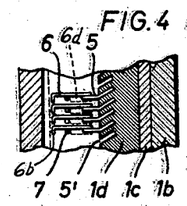
FIG. 4 is a fragmentary sectional view taken on line IV—IV in FIG. 1.

Each jack 5 can be shifted between an advanced operative position in which projection 5d is adapted to engage the butts of the cylinder needles to control the same to knit in accordance with a pattern selected by placing selected jacks in the advanced operative position. As best seen in FIG. 4, jacks 5 are guided in slanted slots in ring 1d. FIG. 1 shows a jack 5 in the retracted inoperative position from which it can be shifted in radially outward direction to the operative position for cooperation at an operating station with the butts of the cylinder needles, not shown.

A series of control members in the form of springs 7 is secured between parts 1e and 1f and carrier means 1, each control spring 7 extending in radial direction, and having an end portion 7b located between opposite cam tracks of a pair of cams $K_1$ and $K_2$ which are secured to the circular wall 3a.

Figure 6:
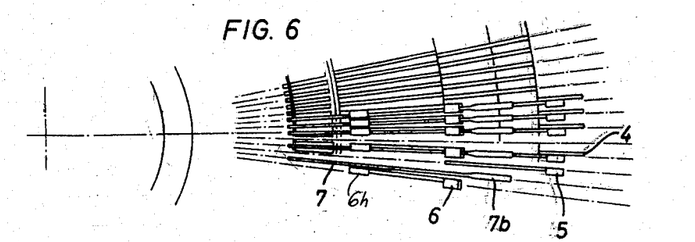
FIG. 6 is a fragmentary plan view of the embodiment of FIG. 1 with the cover plate removed.

As best seen in FIG. 6, each control spring member 7 is associated with a needle-influencing jack element 5. A series of plates 6 is loosely mounted on carrier part 1b, each plate 6 serving the purpose of coupling a control member 7 with a needle-influencing jack element 5 so that plates 6 will be hereinafter referred to as coupling members or coupling plates. As best seen in FIG. 6, a needle-influencing jack 5, a coupling plate 6, and a control spring 7 are aligned in one radial plane.

Figures 7A, 7B:
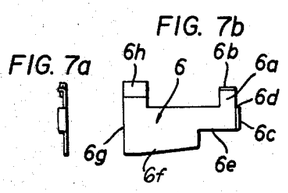

The shape of coupling plate 6 is best seen in FIGS. 7a to 7b. The front end has a projection 6a terminating in a lug or transverse projection 6b, and another transverse lug 6c projects from the front edge 6d of coupling plate 6. The bottom edge has a first part 6e, and a rearwardly located part 6f which is slanted and slightly curved. The rear end 6g has a higher cam follower portion 6h which is bent upon itself to have greater resistance. As best seen in FIG. 1, cam follower portion 6h is located between the pair of endless cam means $K_3$, and the bottom edge 6f rests on the top surface of carrier part 1b, and due to the slant of the bottom edge 6f, each coupling plate can perform a tilting movement in the radial plane about the rear end of bottom edge 6f. Such a tilting movement may cause the coupling projection 6c to enter either slot 5c or 5b, dependent on the relative position between a cooperating pair of members 5, 6.

As shown in FIGS. 1, 4 and 10, each control spring 7 is located between the upper edge of the coupling projections 6c and the transverse projection 6b of the associated coupling member 6. The normal position of control spring 7 is shown in FIG. 1, but during rotation of carrier means 1 relative to cams $K_1$ and $K_2$ each control spring 7 is raised to the higher tensioned position shown in broken lines in FIG. 1, or may be bent down to the lower tensioned position shown in FIG. 1.

A control spring 7 in the higher position will engage the lower face of projection 6b, and hold the respective coupling member 6 in the position illustrated in FIG. 10 or one in which the lower edge of coupling projection 6c is located above, and does not engage the slots 5b and 5c in the respective jack 5. Due to the space between the upper edge 6d of coupling projection 6c and projection 6b, each coupling member 6 can remain in this position even if the respective control spring 7 is in the normal straight position illustrated in solid lines in FIG. 1. However, if a control spring 7 is bent to the lower position shown in broken lines in FIG. 1, then a force will be exerted on coupling projection 6c to urge the same into an aligned slot 5b, in which event members 5 and 6 will be coupled for radial movement under the control of the pair of cooperating cams $K_3$ which are designed to cause a movement of the coupled members 5 and 6 in radial direction for a distance corresponding to the desired displacement of jacks 5 between retracted inoperative and advanced operative position.

When a coupling member 6 is in the position shown in FIG. 1, with coupling projection 6c located outside of coupling slot 5b, but in engagement with the front edge of projection 5a at the rear end of a jack 5, coupling member 6 is coupled to jack 5 for movement in inward radial direction, but is not coupled with jack 5 for movement in outward radial direction.

Figure 9B:
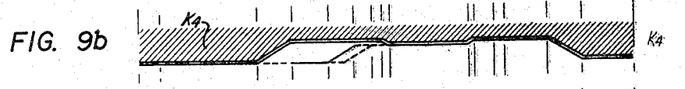
FIG. 9b is a developed sectional view taken on line IV—IV in FIG. 1.

The endless cam $K_4$, see FIG. 9b, cooperates with projection 6b of all coupling members 6, and dwells of cam $K_4$ will cause coupling members 6 to tilt downward about edge 6f so that coupling projection 6c will pass into an aligned coupling slot in the corresponding jack 5, in the same manner as if coupling member 6 were tilted by the corresponding control spring 7.

During rotation of carrier 1 with members 4, 5, 6 and 7, cams $K_3$ will act as control means for moving coupling members 6, and needle-influencing jack elements 5 in radial direction between inner and outer positions, and cams $K_1$, $K_2$, and $K_4$, as well as control members 7 will act as control means for moving coupling members 6 between the inoperative position illustrated in FIG. 1, and a coupling position in which coupling projection 6c engages one of the coupling slots 5b or 5c.

As best seen in FIG. 9a, the broader end portion 7b of each control member 7 will be guided along the upper cam track of cam $K_1$ when carrier means 1 rotates in the direction of the arrow X. At the end of cam $K_1$ each control spring 7 will be in a tensioned upper position, and will be in contact with, or very closely spaced from the end face of the pole 8a of electromagnetic selector means 8. If electromagnetic means 8 is energized at this moment, it will hold the respective control spring 7 in the higher tensioned position, only little magnetic force being required since the bending of control spring 7 from the normal position to the upper tensioned position is not effected by the force of electromagnetic means 8, but by cam $K_1$ and drive torque of the needle cylinder. During further rotation of carrier 1, control spring 7 in the upper tensioned position will be held by pole 8b until the respective portion 7b arrives at the upper cam track $K_{2a}$. Return of control spring 7 to its normal position is prevented by cam $K_2$. Pole 8b may be permanently magnetic, while the narrower pole 8a is selectively energized to attract only certain control members 7, while exerting no magnetic holding force on other control members 7. When a control member 7 passes beyond the end of cam $K_1$ while the selector pole 8a is not energized, the respective control spring 7 will be released from its tensioned position and will tend to assume its normal position. However, it will pass beyond the normal position and may almost reach the lower position shown in FIG. 1 in broken line, and would perform a number of oscillations until stopping in the normal position.

This is prevented by the auxiliary electromagnetic means 9, which serves to dampen the oscillations of a released control spring 7, and restricts the same only to a dampened movement so that the respective control spring 7 stops in its normal position after performing one oscillation so that under no circumstances a control spring 7 will swing back to an upper position in which it may be caught by poles 8a or 8b although it was previously rejected by pole 8a.

As will be explained hereinafter in greater detail, the control springs 7 associated with jacks 5 which are to be moved toward the outer operative position, are not attracted by pole 8a, whereas control springs associated with jacks 5 which have to remain in the inner inoperative position, are attracted by pole 8a and then guided by pole 8b onto cam track $K_{2a}$.

Operation

Figure 9C:
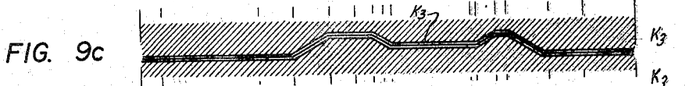
FIG. 9c is a developed sectional view taken on line IXc—IXc.
Figure 9D:
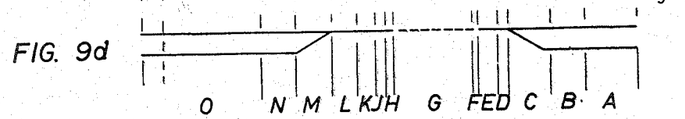
FIG. 9d is a fragmentary schematic developed plan view illustrating the positions of the needle-influencing jacks of the embodiment of FIG. 1, FIGS. 9a to 9d being coordinated to illustrate the relative positions of cams and of elements controlled by the cams during operation.

The operation will be best understood with reference to FIGS. 9a to 9d. Particularly, FIGS. 9a to 9c show operative cams in hatched cross sectional, while FIG. 9d illustrates schematically the positions of the needle-influencing jack elements 5. FIG. 9a shows cams $K_1$ and $K_2$ which effect the up and down movement of control spring 7; FIG. 9b shows cam $K_4$ which effects the downward movement of coupling members 6 which are not operated by control springs 7, and FIG. 9c illustrates in a horizontal view cams $K_3$ which effect the radial movement of coupling members 6, and of those needle-influencing jack elements 5 which are coupled to the respective coupling members 6 at the time of shifting.

Corresponding points of FIGS. 9a to 9d are related by ordinates extending in radial planes passing through the axis of rotation of carrier 1. Circumferential sections are indicated by the capital letters appearing below FIG. 9. An operating station where the jacks have to be arranged in operative and inoperative positions, respectively, in a selected order corresponding ot the desired pattern to be knitted on the circular knitting machine, is assumed to be located at the end of the circumferential section O, and before the beginning of the circumferential section A. The circumferential section G may be considered as a selecting station since at this point electromagnetic means 8a are energized or de-energized to cause selection or non-selection of control springs 7 which determine a corresponding selection of needle-influencing jack elements.

At the beginning of a selecting operation, all jacks are arranged in inoperative or operative positions in accordance with the pattern required during the preceding knitting operation. Jacks 5 have passed through the operating station, and move along the circumferential section A in the direction of the arrow X, which is due to the rotation of carrier 1 driven through teeth 4 by the cylinder needles of the rotating needle cylinder. FIG. 9d shows two parallel lines in the section A, which means that some jacks 5 are in the advanced operative position, and other jacks 5 are in the retracted inoperative position. The old order of the jacks is still maintained in the section B.

In circumferential section A, all coupling members 6 are held by the pair of cams $K_3$ in an outer position, and cam $K_4$ act at the same time on projection 6b to hold the outer ends of coupling members 6 down in the coupling position in which coupling projection 6c is located in slots 5b of jacks 5 in operative position, and located in slot 5c of jacks 5 in the retracted inoperative position. Jacks 5 are thus firmly coupled to coupling members 6 and accurately held in place while acting on the butts of the cylinder needles. Control springs 7 are not engaged by any cam in the section A, and are in the normal straight position.

Springs 7 are raised in section B as shown in FIG. 9a. Cam $K_4$ has a thinner portion in section B so that spring 7 can raise coupling member 6 by engaging the projection 6b from below. Consequently, the coupling projections 6c are pulled out of slots 5b and 5c while the respective coupling member tilts in counterclockwise direction about its bottom edge 6f.

In section C, cams $K_3$ are effective to withdraw coupling members 6 to an inner position. Since coupling projections 6 are no longer located in slots 5c of inoperative retracted jacks, the inward movement of the respective coupling members 6 has no influence on retracted jacks 5. However, advanced previously operative jacks 5 will be retracted since coupling projection 6c engages the outer edge of coupling projection 5a of the respective jack. Consequently at the beginning of section D, all jacks are in the retracted inoperative position, as shown in FIG. 9d by a single line. It will be seen that all jacks 5 remain in the retracted inoperative position until section M is reached in which some jacks are advanced to the operative position, and other jacks retracted to the inoperative position in accordance with the new pattern selected in a manner which will be described hereinafter.

FIG. 1 shows the jacks 5 and coupling members 6 in the retracted postion, but in section D, in which no change of position takes place, control springs 7 are in the upper tensioned position shown in broken lines in FIG. 1.

In the following section E, cams $K_3$ advance coupling members 6 so that coupling projection 6c is located between coupling slots 5b and 5c, as shown in FIG. 10. The positions of control spring 7 remain the same, and coupling members 6 are not tilted.

In the following section F, springs 7 are permitted to move downward for a small distance, and cam $K_4$ urges coupling members 6 to move down a corresponding distance so that the lower edge of coupling projection 6c actually abuts the upper edge of jack 5, as shown in FIG. 10.

In the following section G, which may be considered as a selecting station, coupling members 6 are not displaced by cams K₃ and K₄, but remain with the retracted jacks 5 in the position of FIG. 10.

Control springs 7 are successively guided into the proximity of selector pole 8a. The electromagnetic selector 8 is alternately energized and de-energized in accordance with a program tape in a manner corresponding to the desired new pattern in which the jacks of the pattern wheel have to be arranged during the following knitting operation, as will be understood by those skilled in the art. The arrangement corresponds substantially to the arrangement disclosed in the copending application Schaeder et al., Serial No. 77,389 which discloses a pattern control arrangement improved by the apparatus of the present invention.

When a control spring 7, whose associated jack is to remain inoperative, passes beyond the end of cam K₁, electromagnetic pole 8a is energized, so that the respective control spring 7 is held by the selector pole 8a, and slides first along the same, and then along the end face of the holding pole 8b which is permanently energized. Further rotation of carrier 1 will move the respective control springs 7 beyond holding pole 8b so that the respective release control springs 7 will resiliently engage the upper cam track K₂ₐ of cam K₂ and slide along the same while passing through sections H to N.

When selector pole 8a is not energized when a selected control spring 7 passes beyond the end of cam K₁, the respective control spring 7 is released and tends to resiliently assume its normal position. Due to the resiliency, a released control spring 7 will actually swing to a lower position, and will then be dampened by the magnetic force of the auxiliary magnet 9 to slowly return to its normal position. Preferably, the end face of pole 9 is located in the plane of control springs 7 in the normal position, so that control springs 7 in the normal position will either slide on the end face of magnet 9, or be spaced a very small distance therefrom.

Control springs 7 in this position pass into the region of the lower cam track K₂ᵦ and will remain in the normal position while moving through sections H, J, and K.

In section H, control springs 7 are slightly raised by cam track K₂ₐ. Cam K₄ is recessed to permit an upward movement of coupling members 6. At the same time, cams K₃ move coupling members 6 in inward direction.

In section J, the inward movement of coupling members 6 is continued until projections 6c abut the outer edge of projection 5a of the respective jack 5. Coupling members 6 associated with control spring 7 which pass over the upper cam track K₂ₐ are held in the higher position, but coupling members 6 associated control springs passing along the lower cam track K₂ᵦ, are free to turn due to the action of gravity to a position in which the respective coupling projection 6c drops into the coupling slot 5b of the corresponding jack.

In the following section L, control springs 7 on cam track K₂ᵦ are bent downward to the lower position shown in FIG. 1, engage the upper edge of coupling projection 6c, and force the same into slot 5b of the respective jack coupling members 6 whose associated control springs 7 run on the upper cam track K₂ₐ, cannot move to this coupling position, consequently, only selected coupling members 6 are coupled with the needle-influencing jack elements 5.

In the following section M, all coupling members 6 are shifted by control cams K₃ in outward direction a distance corresponding to the spacing between slots 5b and 5c, as best seen in FIG. 9c. The selected jacks 5, which are coupled with the corresponding coupling members 6 move with coupling members 6 to the outer operative position, but the non-selected jacks which are not coupled to coupling members 6 remain in the retracted position while the corresponding coupling members 6 move outwardly from a position in which coupling projection 6c is located in the region of slot 5b to a position in which coupling projection 6c is located in the region of slot 5c.

In the following section N, coupling members 6 which are still in the higher inoperative position, are engaged by a dwell of cam K₄, so that the respective coupling projections 6c are pressed into the coupling slot 5c. Springs 7 move in this section toward the normal position so that they do not obstruct the downward movement of coupling members 6 by engagement with the projection 6h. In this position, the jacks 5 are arranged in operative and inoperative positions in accordance with the new pattern, as indicated in FIG. 9d, and are all coupled with coupling members 6 which are held by horizontal cam face portion of cam K₄ in the coupled position while spring 7 in the normal position, coupling members 6 in the advanced position, and jacks 5 advance and retract according to the desired pattern, pass through the following section O. The operating station where engagement between projections 5d of the jacks 5 with the cylinder needles of the second knitting machine takes place, is located at the end of section O. After section O follows section A, which is really the same section since the cam shape does not change between sections O and A. Sections A and O together extend over 75% of the circumference of the pattern wheel. It is evident that the pattern selecting operations are again started at the beginning of section B to provide a new pattern of the jacks, if desired.

It will be understood that each of the elements described above, or two or more together, may also find a useful application in other types of pattern wheel differing from the types described above.

While the invention has been illustrated and described as embodied in an electrically controlled pattern selecting arrangement, it is not intended to be limited to the details shown, since various modifications and structural changes may be made without departing in any way from the spirit of the present invention.

Without further analysis, the foregoing will so fully reveal the gist of the present invention that others can by applying current knowledge readily adapt it for various applications without omitting features that, from the standpoint of prior art, fairly constitute essential characteristics of the generic or specific aspects of this invention and therefore, such adaptations should and are intended to be comprehended within the meaning and range of equivalence of the following claims.

What is claimed as new and desired to be secured by Letters Patent is:

1. A pattern wheel arrangement, comprising, in combination, a rotary carrier means; a plurality of needle influencing elements mounted on said carrier means for rotation therewith and for movement in radial direction relative thereto between inoperative and operative positions; a plurality of coupling members, each coupling member being mounted on said carrier means for movement between an inoperative position and a coupling position coupled with one of said needle-influencing elements, said coupling members being movable in said radial direction between an inner position and an outer position for shifting in said coupling position said needle-influencing elements between said inoperative and operative positions; first control means for moving selected coupling members between said inoperative position and coupling position and including selector means so that only selected needle-influencing elements are coupled with said coupling members between said inner and outer positions so that selected needle-influencing elements coupled with said coupling members are shifted to corresponding inoperative and operative positions.

2. A pattern wheel arrangement, comprising, in combination, a rotary carrier means; a plurality of needle-influencing elements mounted on said carrier means for rotation therewith and for movement in radial direction relative thereto between inoperative and operative positions; a plurality of coupling members, each coupling member being mounted on said carrier means for movement between an inoperative position and a coupling position coupled with one of said needle-influencing elements, said coupling members being movable in said radial direction between an inner position and an outer position for shifting in said coupling position said needle-influencing elements between said inoperative and operative positions; a plurality of control members respectively cooperating with said coupling members and being movable for moving corresponding coupling members between said inoperative and coupling positions; selector means for moving selected control members so that only selected needle-influencing elements are coupled with said coupling members; and control means for moving said coupling members between said inner and outer positions so that selected needle-influencing elements coupled with said coupling members are shifted to corresponding inoperative and operative positions.

3. A pattern wheel arrangement, comprising, in combination, a rotary carrier means; a plurality of needle-influencing elements mounted on said carrier means for rotation therewith and for movement in radial direction relative thereto between inoperative and operative positions; a plurality of coupling members, each coupling member being mounted on said carrier means for movement between an inoperative position and a coupling position coupled with one of said needle-influencing elements, said coupling members being movable in said radial direction between an inner position and an outer position for shifting in said coupling position said needle-influencing elements between said inoperative and operative positions; first control means for moving selected coupling members between said inoperative position and coupling position and including electromagnetic selector means so that only selected needle-influencing elements are coupled with said coupling members, and stationary means for holding said coupling members in said coupling position, respectively, during rotation of said carrier means; and second control means for moving said coupling members between said inner and outer positions so that selected needle-influencing elements coupled with said coupling members are shifted to corresponding inoperative and operative positions.

4. A pattern wheel arrangement, comprising, in combination, a rotary carrier means; a plurality of needle-influencing elements mounted on said carrier means for rotation therewith and for movement in radial direction relative thereto between inoperative and operative positions; a plurality of coupling members, each coupling member being mounted on said carrier means for movement between an inoperative position and a coupling position coupled with one of said needle-influencing elements, said coupling members being movable in said radial direction between an inner position and an outer position for shifting in said coupling position said needle-influencing elements between said inoperative and operative positions; first control means for moving selected coupling members between said inoperative position and coupling position and including electromagnetic selector means so that only selected needle-influencing elements are coupled with said coupling members, and stationary means for holding said coupling members in said coupling position, respectively, during rotation of said carrier means; and stationary cam means for moving said coupling members between said inner and outer positions, and for holding said coupling members in said positions during rotation of said carrier means so that needle-influencing elements coupled with said coupling members are shifted to corresponding inoperative and operative positions, and then held in said positions during rotation of said carrier means.

5. A pattern wheel arrangement, comprising, in combination, a plurality of needle-influencing elements mounted on said carrier means for rotation therewith and for movement in radial direction relative thereto between inoperative and operative positions; a plurality of coupling members, each coupling member being mounted on said carrier means for movement between an inoperative position and a coupling position coupled with one of said needle-influencing elements, said coupling members being movable in said radial direction between an inner position and an outer position for shifting in said coupling position said needle-influencing elements between said inoperative and operative positions; a plurality of control members respectively cooperating with said coupling members, each control member being movable between a normal position, a first displaced position, and a second displaced position displaced in the opposite direction for moving the corresponding coupling member to said coupling position; first cam means for moving said control members to said first position during rotation of said carrier means so that at the end of said first cam means said control members tend to return to said normal position; electromagnetic selector means located at said end and being selectively energizable so that selected control members are held in said first position while other selected control members return to said normal position; second cam means having a first cam track for holding said control members in said first position, and a second cam track for moving control members in said normal position to said second position so that the latter move corresponding coupling members from said inoperative to said coupling position whereby only selected needle-influencing elements are coupled with said coupling members; and second control means for moving said coupling members between said inner and outer positions so that selected needle-influencing elements coupled with said coupling members are shifted to corresponding inoperative and operative positions.

6. A pattern wheel arrangement, comprising, in combination, a rotary carrier means; a plurality of needle-influencing elements mounted on said carrier means for rotation therewith and for movement in radial direction relative thereto between inoperative and operative positions; a plurality of coupling members, each coupling member being mounted on said carrier means for movement between an inoperative position and a coupling position coupled with one of said needle-influencing elements, said coupling members being movable in said radial direction between an inner position and an outer position for shifting in said coupling position said needle-influencing elements between said inoperative and operative positions; a plurality of resilient control members respectively cooperating with said coupling members, each resilient control member being movable between a normal position, a first tensioned position, and a second tensioned position tensioned in the opposite direction for moving the corresponding coupling member to said coupling position; first cam means for moving said control members to said first position during rotation of said carrier means so that at the end of said first cam means said control members tend to return to said normal position; electromagnetic selector means located at said end and being selectively energizable so that selected resilient control members are held in said first position while other selected resilient control members return to said normal position; second cam means having a first cam track for holding said resilient control members in said first resilient position, and a second cam track for moving control members in said normal position to said second tensioned positioned so that the latter move corresponding coupling members from said inoperative to said coupling position whereby only selected needle-influencing elements are coupled with said coupling members; third cam means for holding said coupling members in said coupling position during rotation of said carrier means; and fourth cam means for moving said coupling members between said inner and outer positions so that needle-influencing elements coupled with said coupling members are shifted between corresponding inoperative and operative positions.

7. A pattern wheel arrangement, comprising, in combination, a rotary carrier means adapted to turn during each revolution past an operating station and a selecting station; a plurality of needle-influencing elements mounted on said carrier means for rotation therewith and for movement in radial direction relative thereto between inoperative and operative positions; a plurality of coupling members, each coupling member being mounted on said carrier means for movement between an inoperative position and a coupling position coupled with one of said needle-influencing elements, said coupling members being movable in said radial direction between an inner position and an outer position for shifting in said coupling position said needle-influencing elements between said inoperative and operative positions; first control means for moving at said selecting station selected coupling members between said inoperative position and coupling position and including selector means so that only selected needle-influencing elements are coupled with said coupling members; and second control means for moving said coupling members between said inner and outer positions so that selected needle-influencing elements coupled with said coupling members are shifted to said inoperative position before moving through said selecting station, and are shifted to said operative position before passing through said operating station.

8. A pattern wheel arrangement, comprising, in combination, a rotary carrier means adapted to turn past an operating station; a plurality of needle-influencing elements mounted on said carrier means for rotation therewith and for movement in radial direction relative thereto between inoperative and operative positions; a plurality of coupling members, each coupling member being mounted on said carrier means for movement between an inoperative position and a coupling position coupled with one of said needle-influencing elements, said coupling members being movable in said radial direction between an inner position and an outer position for shifting in said coupling position said needle-influencing elements between said inoperative and operative positions; first control means for moving selected coupling members between said inoperative position and coupling position and including selector means so that only selected needle-influencing elements are coupled with said coupling members; second control means for moving said coupling members between said inner and outer positions so that selected needle-influencing elements coupled with said coupling members in said coupling position are shifted from said inoperative to said operative positions; and third control means operative when said selected coupled needle-influencing elements are in said operative position, to move the non-selected coupling members to said coupling position so that the same are coupled with the non-selected needle-influencing elements and hold the same in said inoperative position whereby the operating station is passed by selected needle-influencing elements in said operative position, and by non-selected needle-influencing means in said inoperative position.

9. A pattern wheel arrangement, comprising, in combination, a rotary carrier means adapted to turn past an operating station; a plurality of needle-influencing elements mounted on said carrier means for rotation therewith and for movement in radial direction relative thereto between inoperative and operative positions; a plurality of coupling members, each coupling member being mounted on said carrier means for movement between an inoperative position and a coupling position coupled with one of said needle-influencing elements, said coupling members being movable in said radial direction between an inner position and an outer position for shifting in said coupling position said needle-influencing elements between said inoperative and operative positions; first control means for moving selected coupling members between said inoperative position and coupling position and including selector means so that only selected needle-influencing elements are coupled with said coupling members; second control means including cam means for moving said coupling members between said inner and outer positions so that selected needle-influencing elements coupled with said coupling members in said coupling position are shifted from said inoperative to said operative positions; and third control means including cam means operative when said selected coupled needle-influencing elements are in said operative position, to move the non-selected coupling members to said coupling position so that the same are coupled with the non-selected needle-influencing elements and hold the same in said inoperative position whereby the operating station is passed by selected needle-influencing elements in said operative position, and by non-selected needle-influencing means in said inoperative position.

10. A pattern wheel arrangement as set forth in claim 9 wherein each said coupling member has a coupling projection; and wherein each needle-influencing element is a jack having an inner slot and an outer slot spaced in said radial direction and receiving, respectively, said coupling projection in said inner slot when the respective coupling member is in said inner position, and in said outer slot when the respective coupling member is in said outer position when moving to said coupling position.

11. A pattern wheel arrangement, comprising, in combination, a rotary carrier means; a plurality of needle-influencing elements mounted on said carrier means for rotation therewith and for movement in radial direction relative thereto between inoperative and operative positions; a plurality of coupling members, each coupling member being mounted on said carrier means for movement between an inoperative position and a coupling position coupled with one of said needle-influencing elements, said coupling members being movable in said radial direction between an inner position and an outer position for shifting in said coupling position said needle-influencing elements between said inoperative and operative positions; a plurality of control members mounted on said carrier means and respectively cooperating with said coupling members and being movable for moving corresponding coupling members between said inoperative and coupling positions; selector means for moving selected control members so that only selected needle-influencing elements are coupled with said coupling members, said selector means including electromagnetic means and cam means on said carrier means for guiding said control members toward and away from said electromagnetic means; and control means for moving said coupling members between said inner and outer positions so that selected needle-influencing elements coupled with said coupling members are shifted to corresponding inoperative and operative positions.

12. A pattern wheel arrangement, comprising, in combination, a rotary carrier means; a plurality of needle-influencing elements mounted on said carrier means for rotation therewith and for movement in radial direction relative thereto between inoperative and operative positions; a plurality of coupling members, each coupling member being mounted on said carrier means for movement between an inoperative position and a coupling position coupled with one of said needle-influencing elements, said coupling members being movable in said radial direction between an inner position and an outer position for shifting in said coupling position said needle-influencing elements between said inoperative and operative positions; a plurality of control springs mounted on said carrier means and respectively cooperating with said coupling members and being movable for moving corresponding coupling members between said inoperative and coupling positions; selector means for moving selected control members so that only selected needle-influencing elements are coupled with said coupling members, said selector means including electromagnetic means and cam means on said carrier means for guiding said control springs toward and away from said electromagnetic means; and control means for moving said coupling members between said inner and outer positions so that selected needle-influencing elements coupled with said coupling members are shifted to corresponding inoperative and operative positions.

13. A pattern wheel arrangement, comprising, in combination, a rotary carrier means; a plurality of needle-influencing elements mounted on said carrier means for rotation therewith and for movement in radial direction relative thereto between inoperative and operative positions; a plurality of coupling members, each coupling member being mounted on said carrier means for movement between an inoperative position and a coupling position coupled with one of said needle-influencing elements, said coupling members being movable in said radial direction between an inner position and an outer position for shifting in said coupling position said needle-influencing elements between said inoperative and operative positions; a plurality of control springs mounted on said carrier means and respectively cooperating with said coupling members and being movable for moving corresponding coupling members between said inoperative and coupling positions; selector means for moving selected control members so that only selected needle-influencing elements are coupled with said coupling members, said selector means including electromagnetic means and cam means on said carrier means for guiding said control springs toward and away from said electromagnetic means, said cam means including a first cam portion for guiding all control springs to said electromagnetic means, and a second cam portion having two tracks for moving control springs on one of said tracks to a position for moving corresponding coupling members to said coupling position, said electromagnetic means being located between said first and second cam portions and being selectively energizable and deenergizable for effecting engagement of some control springs by said one track, and of other control springs by the other track of said second cam portion; and control means for moving said coupling members between said inner and outer positions so that selected needle-influencing elements coupled with said coupling members are shifted to corresponding inoperative and operative positions.

14. A pattern wheel arrangement comprising, in combination, a support; a carrier mounted on said support for rotation about an axis and adapted to pass during each revolution past an operating station; a plurality of jacks mounted on said carrier for rotation therewith and for movement in radial direction between an inner inoperative position and an outer operative position; a plurality of coupling members respectively cooperating with said jacks and being mounted on said carrier for movement in radial direction, and for movement transverse to said radial direction between an inoperative position and a coupling position coupled with the respective jack; a plurality of control members mounted on said carrier means biassed to assume a normal position and respectively coupled with said coupling members in a manner permitting relative movement for a limited distance; selector magnet means; first cam means for guiding said control members out of said normal position to a displaced position and into the proximity of said selector magnet means so that the same, when selectively energized, hold control members in said displaced position and, when de-energized permit control members to move to said normal position; second cam means having two cam tracks and extending to said selector magnet means so that control members in said normal position move along one of said cam tracks, and control members in the displaced position move along the other cam track, said one cam track moving said control members to a position for shifting said coupling members to said coupling position; and control means for moving said coupling members in radial direction so that jacks coupled to coupling members are shifted to said operative position before passing through the operating station.

15. A pattern wheel arrangement comprising, in combination, a support; a carrier mounted on said support for rotation about an axis and adapted to pass during each revolution past an operating station; a plurality of jacks mounted on said carrier for rotation therewith and for movement in radial direction between an inner inoperative position and an outer operative position; a plurality of coupling members respectively cooperating with said jacks and being mounted on said carrier for movement in radial direction, and for movement transverse to said radial direction between an inoperative position and a coupling position coupled with the respective jack; a plurality of control members mounted on said carrier means biassed to assume a normal position coupled with said coupling members in a manner permitting relative movement for a limited distance; selector magnet means; first cam means for guiding said control members out of said normal position to a displaced position and into the proximity of said selector magnet means so that the same, when selectively energized, hold control members in said displaced position, and, when de-energized permit control members to move to said normal position; permanent magnet means located adjacent said selector magnet means for holding control members moving beyond said selector magnet means in said displaced position; second cam means having two cam tracks and extending to said permanent magnet means so that control members in said normal position move along one of said cam tracks, and control members in the displaced position move along the other cam track, said one track moving said control members to a position for shifting said coupling members to said coupling position; and control means for moving said coupling members in radial direction so that jacks coupled to coupling members are shifted to said operative position before passing through the operating station.

16. A pattern wheel arrangement comprising, in combination, a support; a carrier mounted on said support for rotation about an axis and adapted to pass during each revolution past an operating station; a plurality of jacks mounted on said carrier for rotation therewith and for movement in radial direction between an inner inoperative position and an outer operative position; a plurality of coupling members respectively cooperating with said jacks and being mounted on said carrier for movement in radial direction, and for movement transverse to said radial direction between an inoperative position and a coupling position coupled with the respective jack; a plurality of control springs mounted on said carrier means biassed to assume a normal position and respectively coupled with said coupling members in a manner permitting relative movement for a limited distance; selector magnet means; first cam means for guiding said control springs out of said normal position to a displaced position and into the proximity of said selector magnet means so that the same, when selectively energized, hold control springs in said displaced position and, when de-energized permit control members to move to said normal position; auxiliary magnet means located opposite said selector magnet means and forming with the same a gap through which said control springs pass, said auxiliary magnet means being adapted to dampen oscillatory movements of said control springs so that control springs returning to said normal position can not swing back to said displaced position; second cam means having two cam tracks and extending to said selector magnet means so that control springs in said normal position move along one of said cam tracks, and control springs in the displaced position move along the other cam track, said one cam track moving said control members to a position for shifting said coupling members to said coupling position; and control means for moving said coupling members in radial direction so that jacks coupled to coupling members are shifted to said operative position before passing through the operating station.

17. A pattern wheel arrangement comprising, in combination, a support; a carrier mounted on said support for rotation about an axis and adapted to pass during each revolution past an operating station; a plurality of jacks mounted on said carrier for rotation therewith and for movement in radial direction between an inner inoperative position and an outer operative position; a plurality of coupling plates respectively cooperating with said jacks, each coupling plate being slidable on a surface of said carrier means for movement in radial direction, and tiltable about an edge thereof between an inoperative position and a coupling position coupled with the respective jack; a plurality of control members mounted on said carrier means biassed to assume a normal position and respectively coupled with said coupling plates in a manner permitting relative movement for a limited distance; selector magnet means; first cam means for guiding said control members out of said normal position to a displaced position and into the proximity of said selector magnet means so that the same, when selectively energized, hold control members in said displaced position and, when de-energized permit control members to move to said normal position; second cam means having two cam tracks and extending to said selector magnet means so that control members in said normal position move along one of said cam tracks, and control members in the displaced position move along the other cam track, said one cam track moving said control members to a position for shifting said coupling plates to said coupling position; and control means for moving said coupling plates in radial direction so that jacks coupled to coupling plates are shifted to said operative position before passing through the operating station.

18. A pattern wheel arrangement comprising, in combination, a support; a carrier mounted on said support for rotation about an axis and adapted to pass during each revolution past an operating station; a plurality of jacks mounted on said carrier for rotation therewith and for movement in radial direction between an inner inoperative position and an outer operative position each jack having two radially spaced coupling slots; a plurality of coupling plates respectively cooperating with said jacks, each coupling plate being slidable on a surface of said carrier means for movement in radial direction, and tiltable about an edge thereof between an inoperative position and a coupling position coupled with the respective jack, each coupling plate having a coupling projection located in said coupling position in one of said coupling slots; a plurality of control members mounted on said carrier means biassed to assume a normal position and respectively coupled with said coupling plates in a manner permitting relative movement for a limited distance; selector magnet means; first cam means for guiding said control members out of said normal position to a displaced position and into the proximity of said selector magnet means so that the same, when selectively energized, hold control members in said displaced position and, when de-energized permit control members to move to said normal position; second cam means having two cam tracks and extending to said selector magnet means so that control members in said normal position move along one of said cam tracks, and control members in the displaced position move along the other cam track, said one cam track moving said control members to a position for shifting said coupling plates to said coupling position located in the inwardly located coupling slot; control means for moving said coupling plates in radial direction so that jacks coupled to coupling plates are shifted to said operative position before passing through the operating station so that said coupling projections of said coupling plates are located in the region of the outwardly located coupling slot of jacks remaining in said inner inoperative position; and cam means for moving the coupling plates associated with jacks in said inoperative position to said coupling position so that said coupling projections of said coupling plates are located in the outwardly located coupling slots of said jacks so that the same are held in said inoperative position while passing through said operating station.

19. A pattern wheel arrangement as set forth in claim 18 and wherein said control means include endless cam means for moving said coupling plates inwardly after said jacks have passed through said operating station so that jacks in said operative positions are moved to said inoperative position when said coupling plates move inwardly.

20. A pattern wheel arrangement as set forth in claim 19 wherein said endless cam means of said control means include two parallel cams, each coupling plate having a projection located between said parallel cams.

References Cited by the Examiner
UNITED STATES PATENTS 3,076,325    2/63    Schmidt _______________ 66—50
3,079,775    3/63    Schaeder ______________ 66—50

RUSSELL C. MADER, *Primary Examiner.*